W. F. GATEWOOD & J. D. McADAMS.
CALCULATING MACHINE.
APPLICATION FILED NOV. 9, 1910. RENEWED MAY 31, 1913.
1,080,907.
Patented Dec. 9, 1913.
10 SHEETS—SHEET 1.
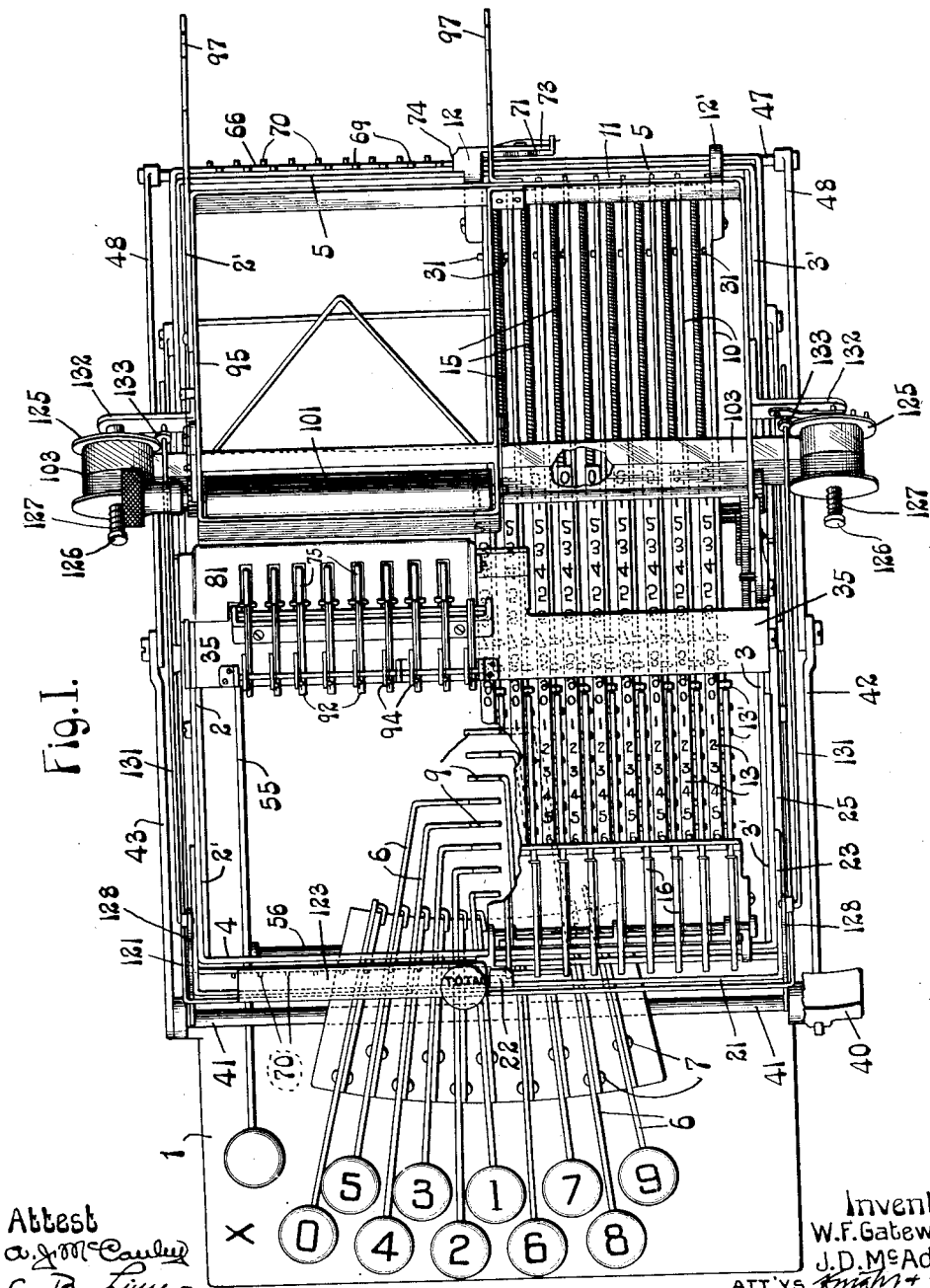

W. F. GATEWOOD & J. D. McADAMS.
CALCULATING MACHINE.
APPLICATION FILED NOV. 9, 1910. RENEWED MAY 31, 1913.

1,080,907.

Patented Dec. 9, 1913.
10 SHEETS—SHEET 2.

Fig. II.

Attest
a. J. McCauley
E. B. Ling

Inventors
W. F. Gatewood
J. D. McAdams
ATTY'S Knight + Cook
BY E. C. Knight

W. F. GATEWOOD & J. D. McADAMS.
CALCULATING MACHINE.
APPLICATION FILED NOV. 9, 1910. RENEWED MAY 31, 1913.

1,080,907.

Patented Dec. 9, 1913.
10 SHEETS—SHEET 3.

Fig. III.

Attest
A. J. McCauley
E. B. Linn

Inventors
W. F. Gatewood
J. D. McAdams
ATT'YS Knight Cook
BY E. J. Knight

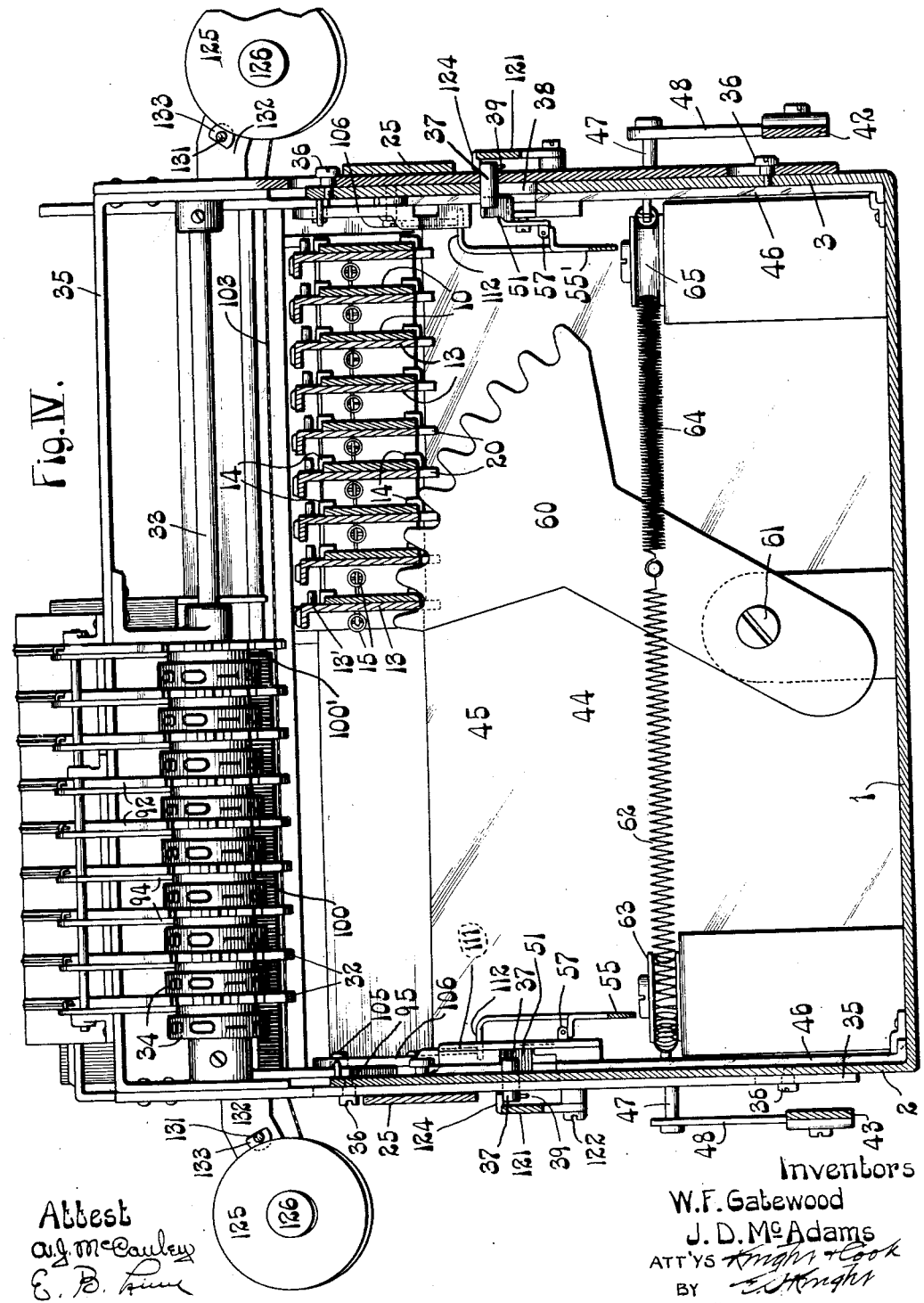

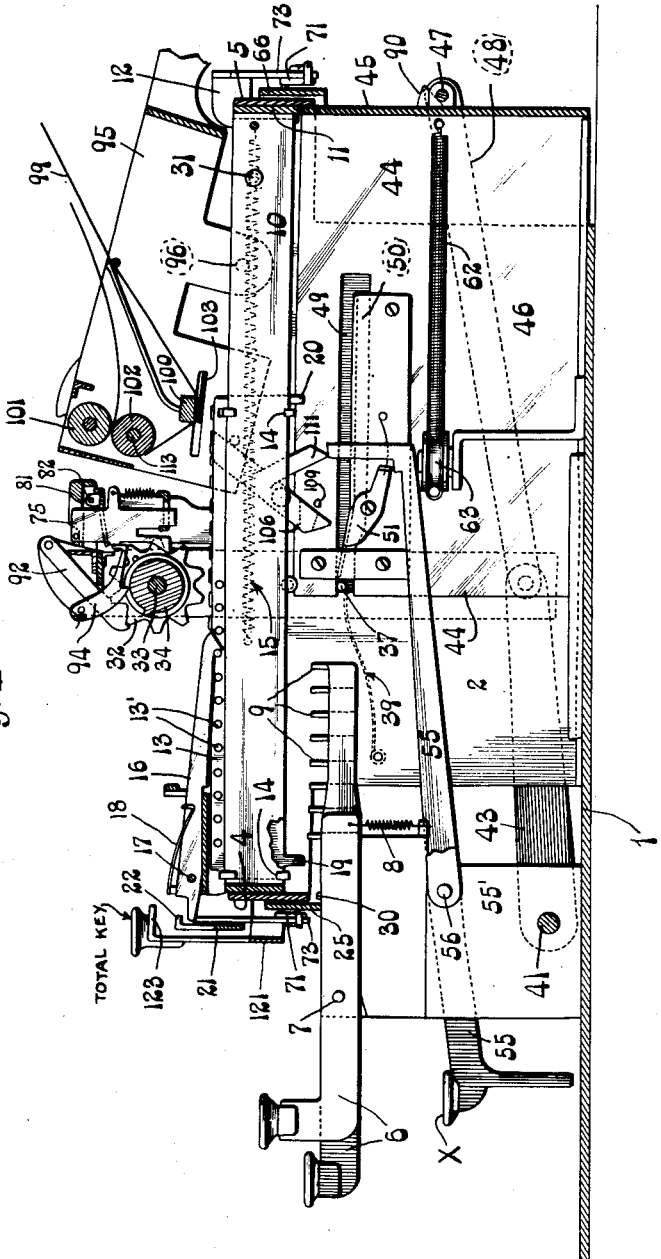

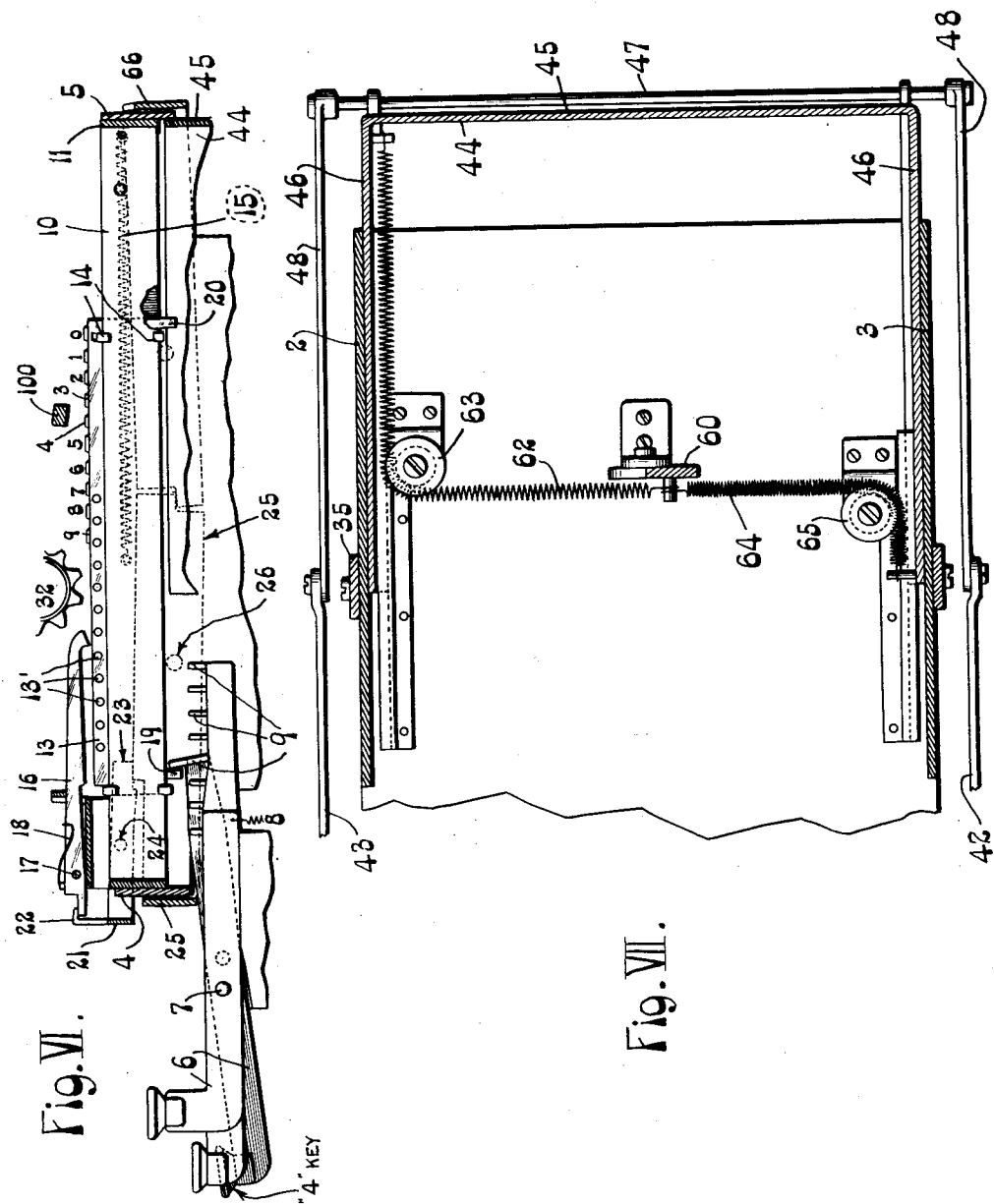

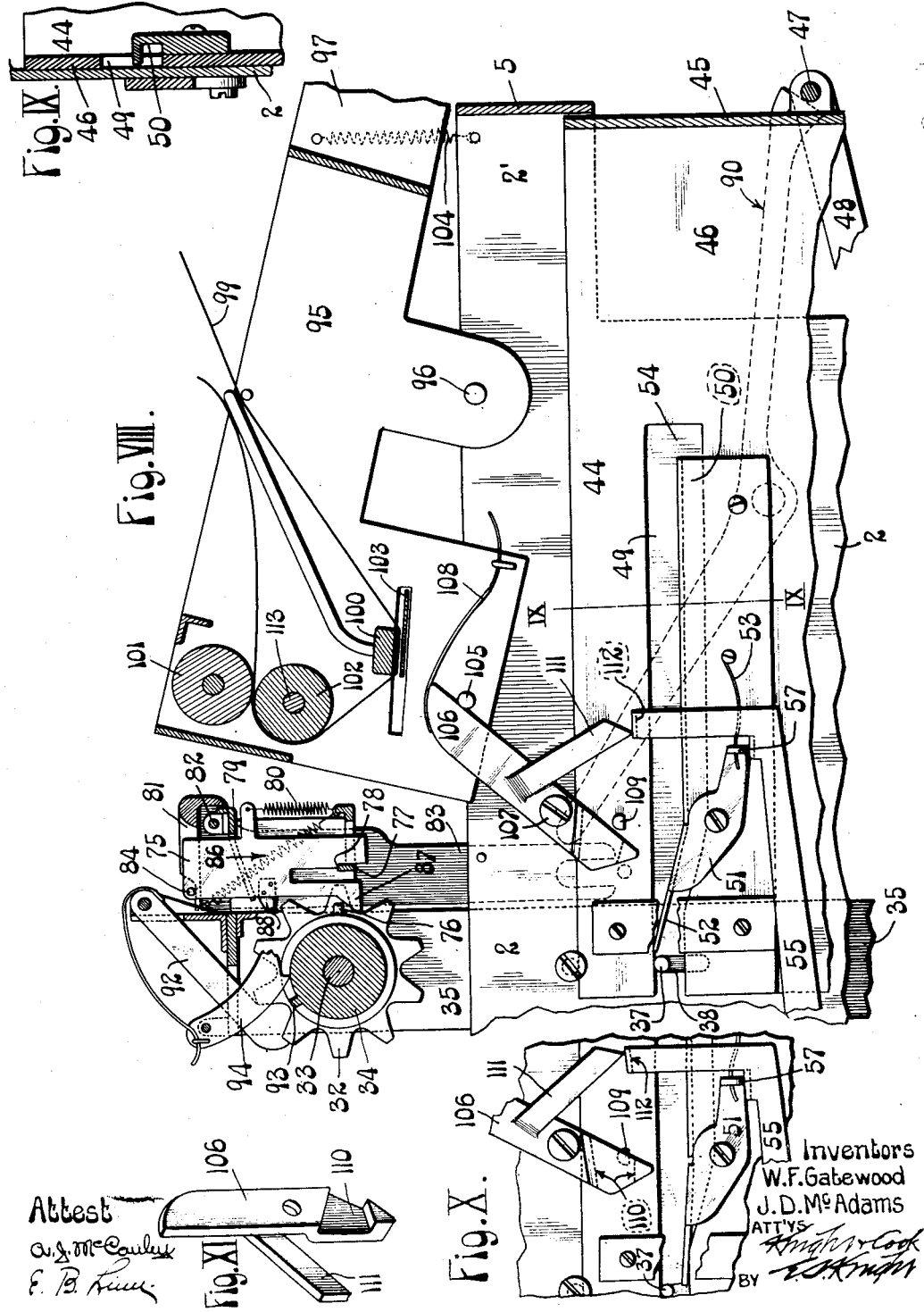

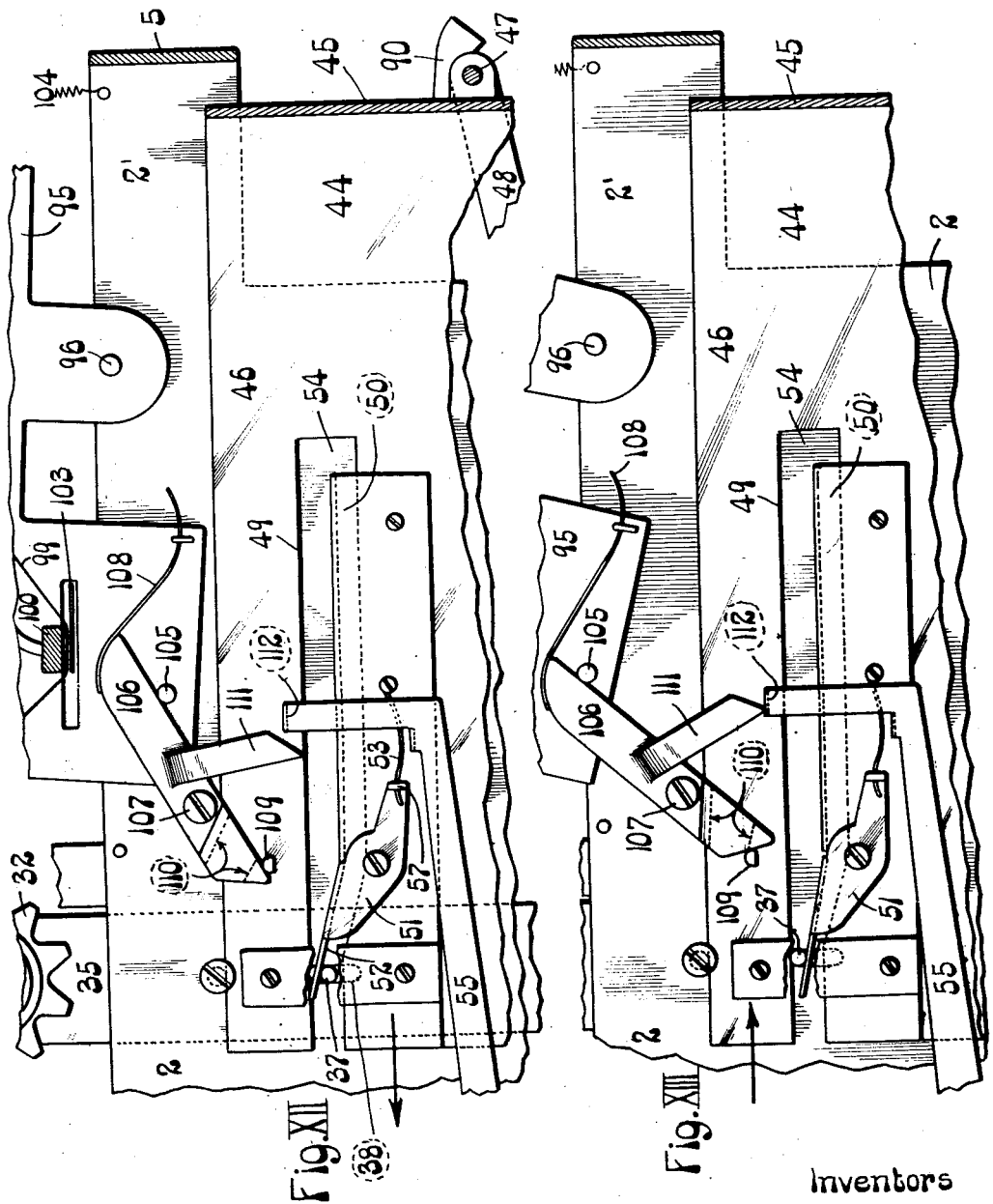

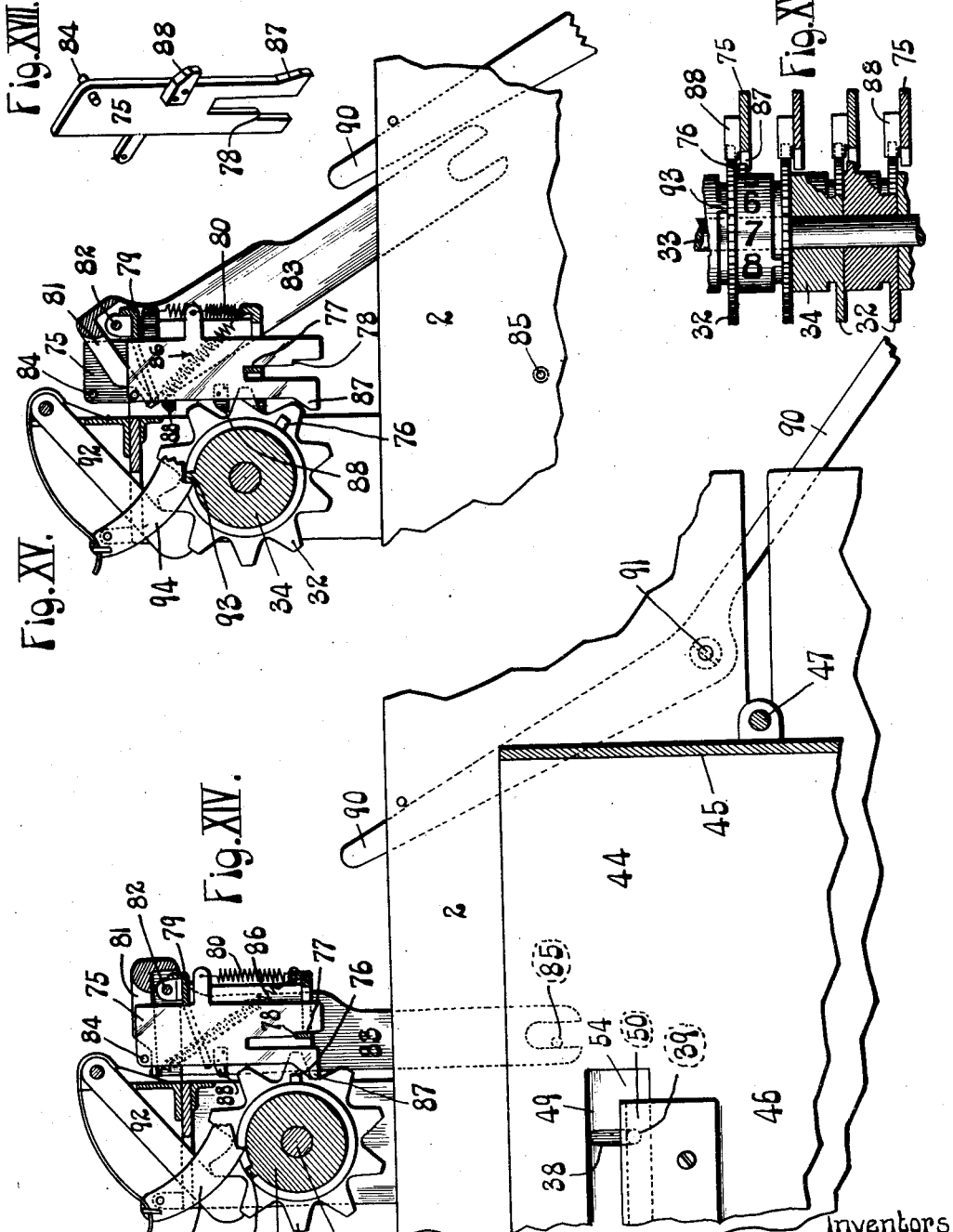

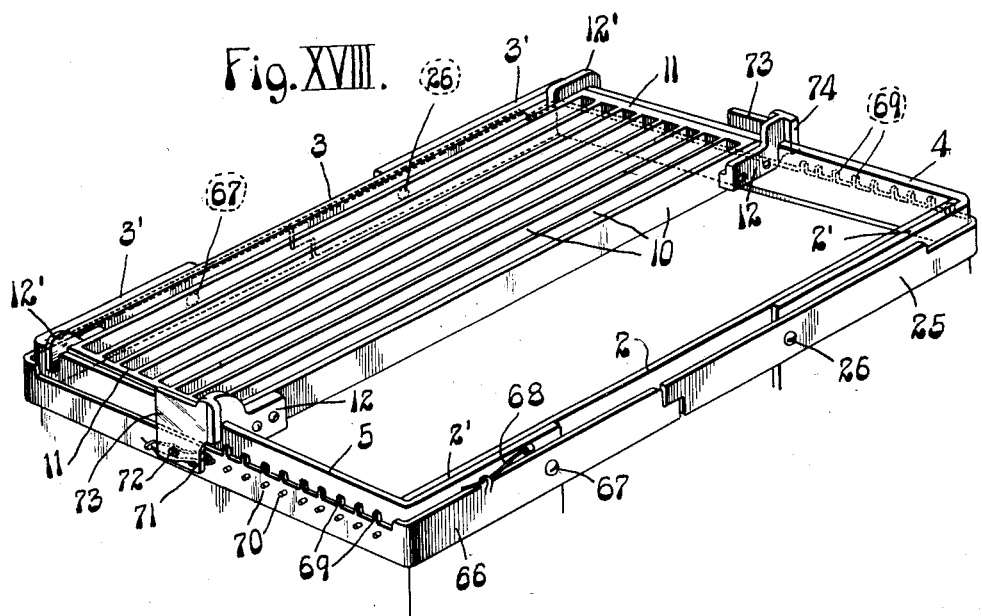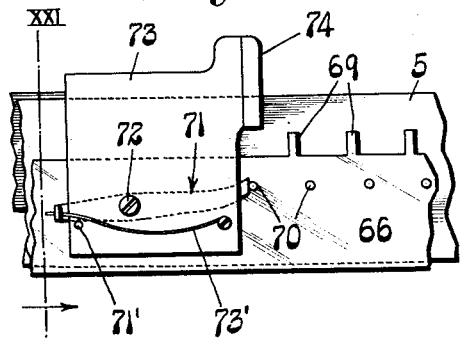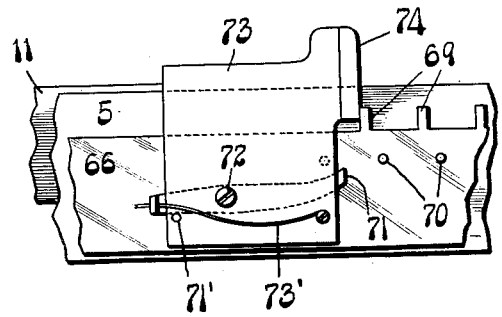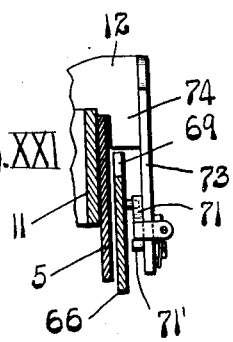

UNITED STATES PATENT OFFICE.

WILLIAM F. GATEWOOD, OF PIERCE CITY, MISSOURI, AND JOHN D. McADAMS, OF ALTON, ILLINOIS.

CALCULATING-MACHINE.

1,080,907.  Specification of Letters Patent.  Patented Dec. 9, 1913.

Application filed November 9, 1910, Serial No. 591,425. Renewed May 31, 1913. Serial No. 771,085.

*To all whom it may concern:*

Be it known that we, WILLIAM F. GATEWOOD and JOHN D. McADAMS, citizens of the United States of America, residing at Pierce City, in the county of Barry and State of Missouri, and Alton, in the county of Madison and State of Illinois, respectively, have invented certain new and useful Improvements in Calculating-Machines, of which the following is a full, clear, and exact description, reference being had to the accompanying drawings, forming part of this specification.

Our invention relates to a calculating machine, the object being to produce a very simple and efficient machine of this character having all of the functions of more complicated adding machines now in use.

The machine herein shown may be briefly described as follows: It comprises a totalizer, ten keys bearing the characters "0" and "1" to "9", inclusive, and a laterally shiftable carriage, the carriage being normally out of alinement with the totalizer and movable step by step in response to movements of the numeral keys. This carriage is provided with rack bars for actuating the totalizer, springs tending to move said rack bars, and locking pawls engaging with teeth on the rack bars to retain them in their normal positions. Upon the operation of a numeral key, the carriage moves one step in a direction parallel to the axis of the totalizer, and one of the rack bars is then located directly below the units wheel of the totalizer. The numeral keys are mounted on key levers, the ends of which have stops for limiting the movement of the rack bars. Depressing a numeral key brings into service a tripping device which releases one of the locking pawls, thereby allowing a spring to move the rack bar longitudinally until its engages the stop on the key lever. Releasing the numeral key causes the locking pawl to engage one of the rack bar teeth and also disengages the stop on the key lever from the rack bar. It will now be understood that operating a numeral key causes the carriage to move one step, locates a rack bar directly below the units wheel of the totalizer, and causes said rack bar to occupy a predetermined abnormal position according to the denomination of the numeral of the depressed key. When the next key is depressed, a second rack bar is released and then locked in an abnormal position, according to the denomination of the key, causing the carriage to move another step in response to this key movement, thereby shifting the first mentioned rack bar to a point directly below the tens wheel of the totalizer, and locating the second rack bar below the units wheel. This action of the carriage and rack bars occurs at each operation of a numeral key. Depressing the "0" key causes the carriage to move one step without releasing a rack bar. After the numeral keys have been operated, the number may be recorded or added in the totalizer by pulling an operating handle. This handle is connected with means for moving the totalizer wheels into engagement with the rack bars and thereafter restoring said rack bars to normal positions. Restoring the rack bars while they are engaged with the totalizer rotates the totalizer wheels a degree corresponding to the value of the numeral keys which were depressed to release the rack bars. The totalizer is moved out of engagement with the rack bars after the latter reach their normal position and the carriage is then restored to its normal or starting position. Each rack bar is provided with a row of printing type bearing the characters "0" and "1" to "9", inclusive. When the rack bars are shifted to abnormal positions, from which they are restored to add a number to the totalizer, type characters corresponding to said number are alined with a movable platen. During the movement of the operating handle, the platen is carried toward the printing type and the numerals are printed on a sheet of paper through the medium of an inking ribbon. In printing a total, the carriage is moved idly a number of steps corresponding to the number of figures shown by the totalizer, this idle carriage movement being obtained by operating the "0" key, and the total key is then depressed. Depressing the total key moves the totalizer into engagement with the spring actuated rack bars and releases said rack bars, allowing the springs to move them until they are stopped by mechanism in the totalizer which stops the total wheels at "0." It is to be understood that the total wheels are reversely rotated in taking a total and that the stops just referred to are effective only during such movement. As the rack bars are only permitted to move while the total wheels are being restored to "0," it will be seen that the final position of each rack bar is determined by the starting position of the total wheel with which it coöperates. The printing type on the rack bars are therefore positioned to print the total, and the printing operation may be performed by pulling the operating handle.

Figure I is a top or plan view of our improved calculating machine. Fig. II is a side elevation showing the left side of the machine. Fig. III is an elevation showing the right side of the machine. Fig. IV is an enlarged transverse section taken at a point in front of the totalizer, looking toward the rear end of the machine. Fig. V is a longitudinal section of the machine. Fig. VI is a detail view showing one of the key levers depressed. Fig. VII is a horizontal section illustrating the means for moving the carriage. Fig. VIII is an enlarged vertical section, partly broken away, taken through the totalizer. Fig. IX is a section on line IX—IX, Fig. VIII. Fig. X is a detail view of a portion of the parts shown in Fig. VIII, showing said parts moved to an inoperative position through the medium of a key lever. Fig. XI is a perspective view of a lever for shifting the platen. Fig. XII is a view similar to Fig. VIII, showing the parts in a moved position. Fig. XIII is a view similar to Fig. XII, showing the parts in another position. Fig. XIV is a vertical section taken through the totalizer, and showing the totalizer in its lowermost position. Fig. XV is a view similar to Fig. XVI, showing the totalizer elevated. Fig. XVI is a horizontal section, partly in elevation, illustrating the total wheels and carrying members. Fig. XVII is a perspective view of one of the carrying members. Fig. XVIII is a perspective view showing the carriage and escapement members, which allow the same to move step by step. Fig. XIX is a detail view of the escapement mechanism. Fig. XX is a view similar to Fig. XIX, showing the escapement mechanism in a moved position. Fig. XXI is a section on line XXI—XXI, Fig. XIX.

In the accompanying drawings: 1 designates a base plate and 2 and 3, respectively designate side plates secured to the base plate. The side plates have extensions 2' and 3', integral with or rigidly secured to cross bars 4 and 5 at the front and rear ends of the machine. All of these parts are stationary, their sole function being to provide a frame for the support of the movable parts of the machine.

*The numeral keys.*—The numeral keys are mounted on key levers 6, pivoted at 7, and held in their normal position by springs 8. These key levers are of different lengths and all of them, except those connected to the "0" and "9" keys, have upturned stops 9, (see Figs. I and V). These stops are arranged in consecutive numerical order according to the numerals of the keys to which they are connected, the numeral key "1" stop being at the front of the row, and the numeral key "8" stop being at the back of the row.

*The carriage.*—The body of the carriage is a frame composed of longitudinal bars 10 connected to transverse end bars 11, (see Fig. XVIII). Guide blocks 12 and 12', rigidly secured to the carriage frame, are slidably mounted on the cross bars 4 and 5 at the front and rear ends of the machine. A series of rack bars 13, provided with teeth 13', (Figs. IV and V), are slidably fitted to the longitudinal bars 10 of the carriage frame, said rack bars having guide lips 14 which overlap the bars 10. Springs 15, secured to the rear end of the carriage frame, are connected at their forward ends to the rack bars. These springs are normally under tension, and tend to pull the rack bars 13 rearwardly when they are free of restraint. The rack bars are locked in their normal positions, (shown in Fig. V), by pawls 16 pivoted to the carriage at 17 and held in engagement with the rack bars by springs 18. Each rack bar is provided at its front end with a depending lug 19 and at its rear end with a similar lug 20. When the carriage is in its normal or starting position, the lug 19 on the rack bar at the left hand end of the carriage is positioned to coöperate with one of the key lever stops 9.

Assuming that the numeral "4" key is depressed, as shown in Fig. VI, the stop 9 at the rear end of the numeral "4" key lever will be elevated and the locking pawl 16 will be released and held in an elevated position by mechanism to be presently described. It will now be seen that the act of depressing the numeral key releases a rack bar and allows the proper spring 15 to move said rack bar until it engages one of the key lever stops 9. When the numeral "4" key is depressed, (Fig. VI), the rack bar corresponding to it moves rearwardly four steps and engages the stop 9 of said key lever. Releasing this key lever will cause its stop 9 to move away from the lug 19 and also allow the pawl 16 to engage a tooth 13' on the rack bar. The pawl 16 will then hold the rack bar in an abnormal position, four steps away from its normal position.

The means for releasing a pawl 16 upon the operation of a key lever comprises a tripping device 21 provided with a tripping projection 22 and having rearwardly extending ends 23 which are pivotally supported at 24, (Figs. I, II and III). The ends 23 of the tripping device rest on a yoke 25 which extends across the front of the machine and is pivoted at 26 to the side plates 2 and 3. Springs 27 engaging the ends of tripping device 21 hold said device, and the yoke 25, in the position shown in Figs. II, III and V. The yoke 25 is forced into engagement with the upper edges of the numeral key levers by the springs 27, and said yoke is therefore elevated during each operation of a key lever. Elevating the yoke 25 raises the ends of the pivoted tripping device 21 and lowers the tripping projection 22 into operative engagement with a pawl 16, as seen in Fig. VI. When the key lever is released, the yoke and tripping device will be restored to normal position by the springs 27. Operating the yoke 25 through the medium of the key levers also operates escapement mechanism which allows the carriage to move toward the left step by step, as will be hereinafter described, the object in so moving the carriage being to locate the rack bars in alinement with totalizer wheels of the proper order. If one key is depressed, the rack bar at the extreme left will be locked in an abnormal position, as previously described, and the carriage will move one step, thereby locating said rack bar in alinement with the units wheel of a totalizer. If another, or second, key is depressed, the rack bar just referred to will be shifted into alinement with the tens wheel of the totalizer and the next adjacent rack bar will be alined with the units wheel. After the carriage has been properly positioned in response to movements of the numeral keys, the totalizer is engaged with the rack bars and the rack bars are then restored to normal position by means which will be hereinafter described.

We have previously stated that the "0" and "9" keys are not provided with stops for the rack bars. The "0" key lever has a lug 30 on its top edge (see Figs. II and V), which lug engages the rigid cross bar 4 when the "0" key is depressed, and thereby limits the degree of movement of the "0" key lever. The yoke 25 is rocked by the "0" key lever so as to operate an escapement and cause the carriage to move one step, but this movement of the yoke 25 is not great enough to cause the tripping device to release any pawl 16. The "0" key lever therefore simply provides for stepping movement of the carriage and does not cause any rack bar to move rearwardly. Operating the numeral "9" key lever shifts the carriage one step, releases the proper pawl 16, and allows a rack bar to move rearwardly until its rear end engages a stop 31 on a longitudinal bar 10 of the carriage frame, (see Figs. I and V), this movement being nine times the amount imparted to a rack bar when the numeral "1" key lever is operated.

*The means for engaging the totalizer with its actuating devices.*—The totalizer (Fig. IV) comprises a row of toothed wheels 32 loosely mounted on a shaft 33, an indicator ring 34 being secured to each wheel 32. The totalizer also includes carrying mechanism 70 and other ports to be hereinafter fully described. The totalizer shaft 33 is secured to a vertically movable frame 35 which partially embraces the frame side plates 2 and 3. This frame is slidably connected to said frame plates by screws 36 passing through slots in the vertical legs of said frame. Pins 37, rigidly secured to the totalizer frame, pass through slots 38 in the frame side plates, and serve as means for engaging the totalizer frame with devices for lowering it. Springs 39 having their free ends arranged under the pins 37 support the totalizer frame in elevated position. After the carriage of the machine moves to the left in response to movements of the numeral keys, certain rack bars are directly below totalizer wheels and the totalizer may be moved into mesh with said rack bars by pulling an operating handle 40. This operating handle is secured to one end of a rock shaft 41 and has a rearwardly extending arm 42. An arm 43 is secured to the opposite end of the rock shaft 41. A slidable section 44, having an end wall 45 and side wings 46, is mounted between the frame plates 2 and 3. A cross rod 47 secured to the end wall 45 is connected to the arms 42 and 43 by links 48. It will now be understood that the operating handle is connected to the slidable section 44 in such manner as to cause the latter to move forwardly when the handle is pulled forwardly.

The wings 46 of the slidable section 44 are provided with a pair of guideways 49 and 50 for the reception of the pin 37 which projects from the totalizer frame, (see Figs. VIII and IX). A pawl 51 provided with an inclined face 52 is held in the position shown in Fig. VIII by a spring 53, the upper end of said pawl being engaged with the top wall of the guideway 49. When the slidable section 44 is pulled forwardly, the pin 37 on the totalizer frame moves downwardly on the inclined face 52, and said pin 37 is eventually located in the lower guideway 50. This movement of the pin 37 results in downward movement of the totalizer frame and locates the total wheels in engagement with the rack bars 13 in position to be engaged thereby. A continued movement of the slidable section 44 causes its end wall 45 to engage the depending lugs 20 on the rack bars with the result of pushing said rack bars forwardly to normal positions, and at the same time cause them to impart rotation to the total wheels. The locking pawls 16 allow the rack bars to move forwardly and automatically lock said bars when they reach their normal positions.

The springs 39 which normally hold the totalizer frame elevated are allowed to restore said frame when the slidable section reaches the end of its forward stroke. At this time the pin 37 on the totalizer frame moves upwardly in the space 54 at the rear ends of the guideways 49 and 50. The slidable section may then be moved rearwardly to normal position by the operating handle.

In the event that an error has been made in operating the numeral keys, the rack bars may be restored to normal position without operating the totalizer. This action is obtained by moving the pawl 51 out of alinement with the pin 37, as shown in Fig. X, and thereby allowing the slidable section to operate without depressing said pin.

The means for rendering the pawls 51 ineffective comprises a key X at the left side of the keyboard to which a lever 55 is connected, (see Fig. V), said lever being fixed to one end of a transverse rock shaft 56 having a rocker arm 55' secured to its opposite end. The rear end of lever 55 coöperates with a pawl 51 at the left side of the machine, while the rocker arm 55' coöperates with a pawl 51 at the right side of the machine. The pawl 51, (see Figs. VIII and X), is provided with a lip 57 which lies above the rear end lever 55. Depressing the key X will raise the rear end of lever 55 and thereby cause the pawl 51 to move from the position seen in Fig. VIII to the position shown in Fig. X.

*Means for moving the carriage.*—The means for moving the carriage includes a sector 60, (Figs. IV and VII), pivoted at 61, and having teeth at its upper end which engage longitudinal members of the carriage. A feed spring 62, connected to the sector, passes around a pulley 63 at the left hand side of the machine, and has its rear end secured to the rear end of the slidable section 44. A carriage restoring spring 64 is also connected to the sector 60, passes therefrom around a pulley 65 at the right side of the machine, and has its forward end connected to the slidable section 44. The carriage restoring spring 64 is normally inactive, its coils being contracted so as to exert no pulling action whatever on the sector 60. The feed spring 62 is normally under tension and tends to pull the carriage toward the left hand side of the machine. Upon the operation of the key levers, an escapement device, which will be presently described, is brought into service to allow the spring 62 to move the carriage to the left, step by step. When the slidable section 44 is pulled forwardly by the operating handle 40, (see Fig. VII), the rear end of the feed spring 62 moves forwardly and the forward end of said spring also moves forwardly. This movement results in relaxation of the feed spring and places the carriage restoring spring under tension. The sector 60 therefore moves to the right and restores the carriage to normal position when the slidable section reaches the end of its forward stroke. The carriage is locked in its normal or starting position by escapement mechanism. When the slidable section is moved rearwardly to normal position by the operating handle, the springs are again located as seen in Fig. VII, wherein the restoring spring 64 is relaxed and spring 62 is under tension.

The escapement mechanism, (see Figs. XVIII to XXI), comprises a yoke 66, which partially embraces the rear end of the machine, the forward end of said yoke overlapping the yoke 25. The yoke 66 is pivoted at 67 to the frame side plates 2 and 3, and held in normal position by a spring 68. Each yoke 25 and 66 is provided with a row of vertical teeth 69, and a row of alined horizontal pins 70. One of the pins 70 on each yoke normally engages the end of a pawl 71, pivoted at 72 to a plate 73 which is secured to the carriage. Upon the operation of a key lever, the front end of the yoke 25 moves upwardly, with the result of imparting a rocking movement to the yoke 66. This upward movement locates one of the teeth 69 in alinement with an abutment 74 on the plate 73 and at the same time disengages the pin 70 from the pawl 71. The carriage then moves under the influence of spring 62 until the abutment 74 engages a tooth 69, (see Fig. XX), and when the key lever is released, the toothed end of each escapement yoke moves downwardly, thereby releasing the teeth 69 from the abutments 74 and locating the next adjacent pin 70 in alinement with the end of a pawl 71. It will therefore be understood that the operation of a key lever allows the carriage to move one step, the operation just described being repeated each time a key lever is depressed and afterward released. The pawl 71 is held against a stop 71' by a spring 73'. When the carriage is restored to normal position, the spring pressed pawl 71 moves under the row of pins 70 and finally stops in the position shown in Fig. XIX, where it holds the carriage in its normal position.

*The totalizer.*—A carrying dog 75 is located adjacent to each of the total wheels 32, and each of said wheels carries a lug 76 which coöperates with one of the carrying dogs. The carrying dogs 75 are supported by a frame having a bar 77 that engages a shoulder 78 near the lower end of each dog, and a slotted plate 79 that engages the rear edges of the dogs. The abutment 77 is preferably a rigid bar arranged parallel to the axes of the total wheels and constituting a support for the series of carrying dogs. A comb shaped plate 81 pivoted at 82 separates the upper ends of the carrying dogs, said plate 81 having an arm 83 that lies against the outer face of the frame side plate 2. The upper ends of the dogs 75 are provided with projections 84 overlying the teeth of the comb plate 81. When the totalizer is in its elevated position, the slotted lower end of the arm 83 is located directly above a pin 85 on the frame side plate 2, and when the totalizer is lowered to engage the rack bars, said pin 85 is located in the slotted lower end of the arm 83, (see Fig. XIV), and the comb plate 81 to which said arm is secured is spaced a slight distance away from the projections 84 on the carrying dogs. A spring 86 tends to rock the arm 83 to the position seen in Fig. XV, and therefore holds said arm engaged with the pin 85, as shown in Fig. XIV, when the totalizer is lowered. Each carrying dog has a rigid foot 87 arranged in the path of movement of a lug 76 on a totalizer wheel. Each dog also has a tooth 88 located directly above a tooth on the next adjacent totalizer wheel. When a totalizer wheel moves from "9" to "0," its lug 76 engages a foot 87 of a carrying dog, with the result of shifting said dog laterally and releasing it from the abutment 77, thereby allowing the corresponding spring 80 to move the dog downwardly the slight distance, this downward or longitudinal movement being limited by a comb plate 81 which then engages the projections 84. When the totalizer is elevated and released from the rack bars, the arm 83 is disengaged from the pin 85 and a spring 80 then moves the carrying dog downwardly to the position seen in Fig. XV. During this downward movement, the tooth on the carrying dog engages the adjacent totalizer wheel and rotates it one step. The tripped carrying dogs are elevated to normal position during the rearward stroke of the slidable section 44 through the medium of a lever 90, pivoted at 91 to the frame side plate 2, (Figs. II, XIV and XV.) The lever 90 is rocked by the rod 47 at the rear end of the slidable section, while the latter is moving rearwardly, and this rocking movement shifts the lever 90 from the position shown in Fig. XIV or XV, where it will allow the arm 83 to swing rearwardly to the position shown in Fig. II, where it holds said arm in its normal position. Obviously this operation of the lever 90 will cause the pivoted comb 81 secured to the arm 83 to restore the tripped carrying dogs to normal position.

Spring pressed detents 92 are pivoted to the totalizer frame and serve to maintain the total wheels in proper linement.

Each totalizer wheel indicator ring 34 carries a lug 93, (Fig. XIV and Fig. XV), which engages a shoulder on a spring pressed pawl 94 when the total wheel stands at "0." This pawl is only brought into service in clearing the machine or printing a total, as will be hereinafter described.

*The printing mechanism.*—95 designates a printing mechanism frame, pivoted at 96 to the frame side plates 2 and 3, said frame having wings 97 at its rear end that support a spool 98. A strip of paper 99 supplied from spool 98 passes under a platen 100, rigidly secured to the frame 95, and from thence it is deflected upwardly and rearwardly by a pair of feed rolls 101 and 102. The frame 93 is rocked on its pivots 96 to perform a printing operation by mechanism controlled by the operating handle 40. Each rack bar carries a row of printing type bearing the characters "0" and "1" to "9," inclusive, (see Figs. I and VI). These type characters are normally located beyond the end of the platen 100, see Fig. IV, which shows that the platen terminates at 100'. An inking ribbon 103 is located below the platen and above the type characters. It will be evident from the foregoing that all of the rack bars are normally out of alinement with the platen. As the carriage moves toward the left in response to numeral key movements, the rack bars move to points directly below the platen 100; that is to say, all rack bars alined with the totalizer are alined with the platen. The type character "0" appears at the end of each rack bar below the inking ribbon, (Fig. I), and as depressing the "0" key steps the carriage without releasing a rack bar, the type character "0" will move into alinement with the platen upon the operation of the "0" key. The type characters are arranged consecutively, and when a numeral key is depressed, the rack bars are shifted to locate a type character corresponding to the key numeral in alinement with the platen 100. For example, if the numeral "4" key is depressed, as seen in Fig. VI, the proper rack bar moves rearwardly four steps and the type character "4" is then alined with and beneath the platen. The printing occurs during the first part of the movement of the operating handle 40 before the rack bars begin to move forwardly, and the printing action is caused by lowering the printing mechanism frame 95. A spring 104 holds the frame 95 in the position shown in Fig. VIII wherein the platen 100 is located some distance above the rack bars.

We will now describe the means for lowering the platen toward the type, this means being most clearly shown in Figs. VIII to XIII, inclusive. These figures show only one wing of the slidable section, but it will be understood that the wing of the opposite side thereof includes the same elements. Each side plate of the printing mechanism frame 95 carries a pin 105 that engages the upper end of an operating lever 106, said lever being pivoted at 107. A spring 108 holds the lever 106 against the pin 105. The slidable section 44 carries a pin or lug 109 and as this section is moved forwardly by the operating handle, the pin 109 engages the lower end of the lever 106, imparts a rocking movement thereto, and thereby moves the printing mechanism frame 95 downwardly. This action moves the parts to the position shown in Fig. XII wherein the platen has been moved to printing position. A continued movement of the slidable section 44 releases the pin 109 and allows the spring 104 to restore the rockable frame 95. While the slidable section 44 is being restored, the pin 109 strikes the lever 106 (Fig. XIII), imparts a slight idle rocking movement thereto, and then passes through a groove 110 in the lower end of said lever. The groove 110 is shown most clearly in Fig. XI. The lever 106 is provided with a finger 111 which rests on a yieldable lip 112 at the upper end of the key controlled lever 55. This yieldable lip has no function during ordinary operations of the machine, the finger 111 being forced downwardly therefrom during the forward movement of the slidable section 44, and afterward restored to the position seen in Fig. VIII, when the printing elements are restored.

The key X, referred to in describing the totalizer, is also adapted to render the printing mechanism inoperative. The key levers 55 and 55′, which are connected to the key X each have a lip 112 that lies below the finger 111 on an operating lever 106. When the key X is depressed, the rear end of key levers 55 and 55′ are elevated and the operating lever or platen shifter 106 then occupies the position seen in Fig. X. Moving the operating lever to this position allows the pin 109 on the slidable section 44 to pass through the groove 110 without actuating the lever 106. Depressing the key X therefore allows the operating handle 40 to move the slidable section without operating the printing mechanism. This key also prevents the totalizer from moving into mesh with the rack bars, as previously described, and by having these two functions it serves as an "error" key.

The strip of paper 99 is fed during each operation of the handle 40 by rotation of the feed roller 102 a slight distance. This feed roller is mounted on a shaft 113 having a toothed wheel 114 secured to one of its ends, (see Fig. III.) A feed pawl 115 pivoted to the upper end of a lever 116 is held in engagement with the teeth of wheel 114 by a spring 117. The lever 116 is pivoted at 118 to the side plate 3, and it is held against a stop 119 by a spring 120. When the slidable section moves forwardly, the rod 47 carried thereby engages the lower end of the lever 116, imparts movement thereto and thus causes rotation of the toothed wheel 114. During the rearward stroke of the slidable section 44, the lever 116 and pawl 115 are restored by the spring 120.

*The total key.*—The total key is secured to a rockable U-shaped lever 121 having its ends pivotally connected at 122 to the side frame plates 2 and 3, respectively. The total key lever has a long flange 123 which constitutes a tripping device for releasing the pawls 16. This tripping device is similar to the tripping device 22 that releases the pawls 16 when the numeral keys are depressed, but it is located so as to release the pawls only when their adjacent rack bars are alined with the totalizer. The total key lever also has projections or lips 124 that rest on the pins 37 which project from the totalizer frame, (see Figs. II, III and IV.)

In printing a total, the carriage is moved idly a number of steps corresponding to the number of figures in the total, the latter being indicated by the indicator rings 34. After positioning the carriage, the total key may be depressed with the result of moving the totalizer downwardly into mesh with rack bars, through the medium of the projections 124 resting on the pins 37 which project from the totalizer frame. Depressing the totalizer key also causes its tripping device 123 to release all of the rack bars that are in mesh with total wheels. When the rack bars are so released, they are pulled rearwardly by the springs 15 until the lug 93 (see Fig. XV), on the numeral ring engages a shoulder on the spring pressed stop 94. The total wheels are rotated reversely during this rack bar movement and when stopped by the member 94 they stand at "0." It will therefore be seen that the movement of each rack bar is determined by the position of the total wheels which it operates; for example, if a total wheel stands at "4," the rack bar is allowed to move rearwardly four steps and the type character "4" is then positioned directly below the platen. All of the release rack bars are positioned accordingly, and the type characters are positioned to print the total. The printing may then be performed by rocking the handle 40 as previously described. If the total key is held depressed during the handle movement, the totalizer will remain in engagement with the rack bars and the total will again be inserted in the totalizer. The totalizer may be cleared by releasing the rack bars through the medium of the total key, as just described, then releasing the total key to disengage the cleared totalizer from the rack bars, and thereafter depressing the key X while the handle 40 is being operated.

The inking ribbon is preferably provided with ink of two different colors, or composed of two separate ribbons of different colors. This ribbon is wound around spools 125 supported by the frame 95, and it may be automatically fed from one spool to the other in any suitable manner. The ribbon spools 125 are slidably mounted on rods 126, and prevented from accidentally shifting thereon by springs 127. When the total key is depressed, the ribbon spools are automatically shifted to cause the total to be printed in a different color from the column of figures. The means for shifting the ribbon spools comprises a pair of bell crank levers 128 pivoted at 129 and having feet 130, which extend under the total key lever. Each bell crank lever is connected to a rod 131, having its rear end slidably mounted in a bracket 132. Each rod is provided with a projection 133, which engages a ribbon spool, (see Figs. I and IV.) When the total key is depressed, the bell crank levers 128 are rocked to impart a longitudinal movement to the rods 131, thereby shifting the ribbon spools so as to print the total in ink of a different color from that used in printing the other items.

We claim:

1. In a calculating machine, a totalizer, numeral keys, a laterally movable carriage movable step by step toward said totalizer in response to movements of the numeral keys, totalizer actuating devices carried by said carriage, springs for actuating said actuating devices, means for locking said actuating devices in their normal positions, means for releasing said actuating devices independently, and means for releasing all of said actuating devices collectively.

2. In a calculating machine, a totalizer, numeral keys, a laterally movable carriage movable step by step toward said totalizer in response to movements of the numeral keys, totalizer actuating devices carried by said carriage, springs for actuating said actuating devices, means for locking said actuating devices in their normal positions, means controlled by the numeral keys for releasing said actuating devices independently, and means for releasing all of said actuating devices collectively.

3. In a calculating machine, a totalizer, numeral keys, a laterally movable carriage movable step by step toward said totalizer in response to movements of the numeral keys, totalizer actuating devices carried by said carriage, springs for operating said actuating devices, pawls for locking said actuating devices in their normal positions, a tripping device controlled by the numeral keys adapted to release said pawls independently, a total key, and means controlled by the total key for releasing said pawls collectively.

4. In a calculating machine, a totalizer, numeral keys, a carriage movable step by step toward the totalizer in response to movements of the numeral keys, totalizer actuating devices carried by said carriage, springs for operating said actuating devices, locking means associated with each actuating device for holding it in its normal position, a tripping device adapted to release said actuating devices consecutively while the carriage is being moved toward the totalizer, a total key, and means controlled by the total key for releasing said actuating devices collectively.

5. In a calculating machine, a totalizer, numeral keys, a carriage movable step by step in response to movements of the numeral keys, slidable totalizer actuating devices carried by said carriage normally out of alinement with the totalizer and movable into alinement therewith upon the operation of the numeral keys, springs for operating said actuating devices, locking means associated with each actuating device for holding it in its normal position, a tripping device operable by said numeral keys adapted to release said actuating devices consecutively, and a tripping device adapted to release the actuating devices alined with the totalizer.

6. In a calculating machine, a totalizer, numeral keys, a carriage movable step by step in response to movements of the numeral keys, slidable totalizer actuating devices carried by said carriage normally out of alinement with the totalizer and movable into alinement therewith upon the operation of the numeral keys, springs for operating said actuating devices, locking means associated with each actuating device for holding it in its normal position, a tripping device operable by said numeral keys adapted to release said actuating devices consecutively, a tripping device adapted to release the actuating devices alined with the totalizer, and a total key connected to the last named tripping device.

7. In a calculating machine, a totalizer, a carriage, totalizer actuating devices carried by said carriage, a spring connected with said carriage and adapted to move the carriage in one direction, a restoring spring connected with said carriage, a movable member connected with the free ends of said springs, and means for operating said movable member.

8. In a calculating machine, a totalizer, means for operating said totalizer, said means including a carriage, a member adapted to move said carriage, springs connected with said carriage moving member and extending in opposite directions therefrom, only one of said springs being normally under tension, a movable member connected with the ends of said springs, means for operating said movable member so as to release the spring that is normally under tension and place the other spring under tension, and means for locking said carriage moving member in its normal position while said movable member is being restored to normal position.

9. In a calculating machine, a totalizer, means for operating said totalizer, said means including a carriage, a sector adapted to move said carriage, springs connected with said sector and extending in opposite directions therefrom, only one of said springs being normally under tension, a movable member connected with the ends of said springs, means for operating said movable member so as to release the spring that is normally under tension and place the other spring under tension, and means for locking said sector in its normal position while said movable member is being restored to normal position.

10. In a calculating machine, a totalizer, a carriage, a spring connected with said carriage and adapted to move it from its normal position, said spring being normally under tension, a restoring spring connected with said carriage, the restoring spring being normally ineffective, a movable member connected with the free ends of said springs, and means for operating said member so as to release the first mentioned spring and place the last mentioned spring under tension.

11. In a calculating machine, a totalizer, a carriage, totalizer actuating devices carried by said carriage, a spring connected with said carriage and adapted to move it from its normal position, said spring being normally under tension, a restoring spring connected with said carriage, the restoring spring being normally ineffective, a movable member connected with the free ends of said springs, and means for operating said member so as to release the first mentioned spring and place the last mentioned spring under tension.

12. A calculating machine totalizer mechanism, comprising a series of alined total wheels, a stationary abutment parallel with the axes of said total wheels, a series of single carrying dogs coöperable with couples of said total wheels and which are normally supported by said abutment; each carrying dog having as rigid parts thereof a member operable by one total wheel of a couple of the wheels for disengaging the dog from said abutment and a member for engagement with the second wheel of a couple of total wheels to impart movement thereto following the dislodgment of the carrying dog from said abutment.

13. A calculating machine totalizer mechanism, comprising a series of alined total wheels, a stationary abutment parallel with the axes of said total wheels, a series of single carrying dogs coöperable with couples of said total wheels and which are normally supported by said abutment; each carrying dog having as rigid parts thereof a member operable by one total wheel of a couple of the wheels for disengaging the dog from said abutment and a member for engagement with the second wheel of a couple of total wheels to impart movement thereto following the dislodgment of the carrying dog from said abutment; and means for temporarily supporting said dogs after they have been tripped from said abutment and before they partake of movement to operate the second total wheels in the couples of said wheels.

14. A calculating machine totalizer mechanism, comprising a series of alined total wheels, a stationary abutment parallel with the axes of said total wheels, a series of single carrying dogs coöperable with couples of said total wheels and which are normally supported by said abutment; each carrying dog having as rigid parts thereof a member operable by one total wheel of a couple of the wheels for disengaging the dog from said abutment and a member for engagement with the second wheel of a couple of total wheels to impart movement thereto following the dislodgment of the carrying dog from said abutment; and means for restoring said dogs to their normal positions upon said abutment.

15. A calculating machine comprising total wheels, actuating devices therefor, said actuating devices including a single carrying dog coöperable with each total wheel, said dog having a rigid foot adapted to be shifted through the medium of a total wheel and a tooth adapted to actuate another total wheel.

16. A calculating machine comprising total wheels, actuating devices therefor, said actuating devices including a single carrying dog coöperable with each total wheel, springs tending to move said dogs, and means for holding said dogs, each of said dogs having a rigid foot adapted to be shifted laterally through the medium of a total wheel so as to release said dog and allow one of said springs to move it longitudinally, each of said dogs also having a tooth adapted to actuate a total wheel.

17. A calculating machine comprising actuating devices, total wheels adapted to be moved into and out of engagement with said actuating devices, each of said total wheels being provided with a lug, a movable support for said total wheels, an abutment rigidly secured to said support, spring actuated carrying dogs straddling and resting on said rigid abutment, each of said dogs having a tooth adapted to mesh with a total wheel, and a rigid foot, said rigid foot being located in the path of movement of the lug on a total wheel whereby the carrying dog may be shifted laterally and released from the rigid abutment, thereby allowing said dog to move longitudinally, into mesh with a total wheel, with the result of moving said wheel one step.

18. In a calculating machine, a totalizer, totalizer actuating devices normally spaced away from the totalizer, numeral keys through the medium of which said actuating devices may be moved to predetermined positions, means for engaging the totalizer with said actuating devices, means for restoring the actuating devices while they are engaged with the totalizer, said restoring means being connected with the means for engaging the totalizer with the actuating devices, the means for engaging the totalizers with the actuating devices including a movable member for transmitting the movement of the restoring means to the totalizer, and means for shifting said movable member to allow said restoring means to operate independently of the means for engaging the totalizer with the actuating devices.

19. In a calculating machine, a totalizer, totalizer actuating devices normally spaced away from the totalizer, numeral keys through the medium of which said actuating devices may be moved to predetermined positions, means for engaging the totalizer with said actuating devices, means for restoring the actuating devices while they are engaged with the totalizer, said restoring means being connected with the means for engaging the totalizer with the actuating devices, the means for engaging the totalizer with the actuating devices including a movable member for transmitting the movement of the restoring means to the totalizer, and key controlled devices for shifting said movable member to allow said restoring means to operate independently of the means for engaging the totalizer with the actuating devices.

20. In a calculating machine, a totalizer, a movable support for said totalizer, said support having a projection, totalizer actuating devices normally spaced away from the totalizer, a slidable member having a pair of parallel guideways the ends of which communicate with each other, a device movably mounted on said slidable member, said movable device having an inclined face for engaging said projection and causing it to pass from one of the guideways to the other during the movement of said slidable member, thereby moving the totalizer into engagement with its actuating devices, and means for restoring said totalizer to normal position.

21. In a calculating machine, a totalizer, a movable support for said totalizer, said support having a projection, totalizer actuating devices normally spaced away from the totalizer, a slidable member having a pair of parallel guideways the ends of which communicate with each other, a device movably mounted on said slidable member, said movable device having an inclined face for engaging said projection and causing it to pass from one of the guideways to the other during the movement of said slidable member, thereby moving the totalizer into engagement with its actuating devices, and a spring for restoring said totalizer to normal position.

22. In a calculating machine, a totalizer, a movable support for said totalizer, said support having a projection, totalizer actuating devices normally spaced away from the totalizer, a slidable member having a pair of parallel guideways the ends of which communicate with each other, a device movably mounted on said slidable member having an inclined face for engaging said projection and causing it to pass from one of the guideways to the other during the movement of said slidable member, thereby moving the totalizer into engagement with its actuating devices, a spring for restoring said totalizer to normal position, and means for shifting said movable device to allow the slidable member to operate independently of the totalizers.

23. In a calculating machine, a totalizer, a movable support for said totalizer, said support having a projection, totalizer actuating devices normally spaced away from the totalizer, a slidable member having a pair of parallel guideways the ends of which communicate with each other, a device movably mounted on said slidable member having an inclined face for engaging said projection and causing it to pass from one of the guideways to the other during the movement of said slidable member, thereby moving the totalizer into engagement with its actuating devices, a spring for restoring said totalizer to normal position, and key controlled means for shifting said movable device to allow the slidable member to operate independently of the totalizers.

24. In a calculating machine, a totalizer, a movable support for said totalizer, said support having a projection, totalizer actuating devices normally spaced away from the totalizer, a slidable member having a pair of guideways located in different planes for the reception of said projection, a device pivoted to said slidable member, having an inclined face for engaging said projection and causing it to pass from one of the guideways to the other during the movement of said slidable member thereby moving the totalizer into engagement with its actuating devices, and means for restoring said totalizer to normal position.

25. In a calculating machine, a totalizer, means for operating said totalizer, printing type adapted to indicate the numerals represented by said totalizer, a platen adapted to be shifted toward said type, a platen shifting lever operable in response to movements of the totalizer operating means, and key controlled devices for moving said lever out of the path of the totalizer operating means to allow said totalizer operating means to operate independently of the platen shifting lever.

26. In a calculating machine, a totalizer, means for operating said totalizer, said means including a slidable member, printing type adapted to indicate the numerals represented by said totalizer, a rockable platen carrier, a platen mounted on said carrier, a pivoted device engaging said platen carrier, and means for actuating said pivoted device, carried by said slidable member.

27. In a calculating machine, a totalizer, means for operating said totalizer, said means including a slidable member, printing type adapted to indicate the numerals represented by said totalizer, a rockable platen carrier, a platen mounted on said carrier, a pivoted device engaging said platen carrier, means for actuating said pivoted device, said actuating means being carried by said slidable member, and key controlled means for shifting said pivoted device to allow the slidable member to operate independently of the platen carrier.

WILLIAM F. GATEWOOD.

Witnesses:
F. M. JOHNSON,
FLORENCE HEETER.

JOHN D. McADAMS.

Witnesses:
EUGENE A. ELWELL,
H. H. HEWITT.